(12) United States Patent
Velusamy et al.

(10) Patent No.: US 9,148,744 B2
(45) Date of Patent: Sep. 29, 2015

(54) NETWORK DATA OPTIMIZATION

(71) Applicant: T-Mobile USA, Inc., Bellevue, WA (US)

(72) Inventors: Senthil Kumar Mulluppadi Velusamy, Bellevue, WA (US); Abha Bhatia, Sammamish, WA (US); Steve Farsai, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 256 days.

(21) Appl. No.: 13/837,677

(22) Filed: Mar. 15, 2013

(65) Prior Publication Data

US 2014/0106727 A1 Apr. 17, 2014

Related U.S. Application Data (60) Provisional application No. 61/714,705, filed on Oct. 16, 2012.

(51) Int. Cl.
*H04M 3/00* (2006.01)
*H04W 4/00* (2009.01)
*H04W 4/20* (2009.01)

(52) U.S. Cl.
CPC .............. *H04W 4/001* (2013.01); *H04W 4/20* (2013.01)

(58) Field of Classification Search
CPC ......... H04W 8/22; H04W 8/24; H04W 8/245; H04W 4/001; H04W 4/20; H04M 1/72527; H04M 1/72569; H04M 1/72533; H04M 1/72572; H04M 1/72525; H04M 1/72563
USPC .................................................. 455/418–420
See application file for complete search history.

(56) References Cited

U.S. PATENT DOCUMENTS

| | | | |
|---|---|---|---|
| 2004/0148379 A1* | 7/2004 | Ogura ........................... | 709/223 |
| 2007/0078949 A1* | 4/2007 | Washington et al. .......... | 709/217 |
| 2011/0016195 A1* | 1/2011 | Kaplan et al. ................. | 709/219 |
| 2012/0198435 A1* | 8/2012 | Dirstine et al. ............... | 717/173 |
| 2012/0276886 A1* | 11/2012 | Alanen et al. ................. | 455/418 |
| 2013/0275530 A1* | 10/2013 | Matson et al. ................ | 709/206 |
| 2014/0032637 A1* | 1/2014 | Weir ............................. | 709/203 |

* cited by examiner

*Primary Examiner* — Magdi Elhag
(74) *Attorney, Agent, or Firm* — Lee & Hayes, PLLC (57) ABSTRACT

Techniques for alleviating network congestion are described. A telecommunications device may be configured to selectively poll a cellular telecommunications network. The telecommunications device may be configured such that polling of the cellular telecommunications device may be activated and deactivated. The telecommunications device may be configured to poll in response to receiving a notification that a firmware update is available and may be configured to deactivate polling upon successful downloading of the firmware update.

18 Claims, 5 Drawing Sheets

NETWORK DATA OPTIMIZATION

CROSS-REFERENCE TO RELATED APPLICATIONS

This application claims benefit, under 35 U.S.C. §119(e), of U.S. Provisional Patent Application No. 61/714,705, filed Oct. 16, 2012, which is incorporated herein, by reference, in its entirety.

BACKGROUND

Mobile telecommunications devices, such as smartphones, tablets and laptops, commonly have the ability to participate in a cellular telecommunications network typified by high-power/long distance communications networks over licensed spectrum, and alternatively over low-power/short distance communications networks, over unlicensed spectrum, such as a wireless point-to-point communications network. A typical example is a smart-phone that has a data connection over a 3G or 4G cellular plan, but at the same time may participate on a wireless point-to-point communications network (e.g., a Wireless Fidelity (Wi-Fi) (IEEE 802.11) network and/or a Bluetooth (IEEE 802) network).

Firmware Over-the-Air (FOTA) may be used for upgrades of mobile telecommunications devices. FOTA provides end-user benefits such as updating firmware software with bug fixes, providing new functionality, improvements, etc. FOTA may be implemented by various mechanisms: Push; Poll; and Pull. Each of these mechanisms have individual strengths and weaknesses, as discussed below:

- Push: FOTA update is initiated at a push-server of a telecommunications network. The push-server needs to identify which mobile telecommunications devices may require a specific firmware update. (Frequently, firmware updates are device/device-manufacturer specific. So, not all telecommunications device of a telecommunications network may require a specific firmware update.) The push-server needs to identify which of the identified mobile telecommunications devices failed to successfully download the specific firmware update and reschedule follow-up updates. In some cases, the push server may need to reschedule multiple follow-up update. For example, if the average download success rate is 80%, then, on the average, the push-server will need to schedule at least five download sessions to successfully update 99.968% of the identified telecommunications devices. For various reasons, some of the identified telecommunications devices may be difficult to update. For example, they may be primarily located in zones of low coverage or low quality of service, and these telecommunications devices may require many more update follow-ups than the average telecommunications device.
- Poll: The telecommunications device can periodically poll the telecommunications network for firmware updates. However, polling may cause network congestion or unnecessary network traffic. For example, firmware updates may be relatively rare (e.g., once every 6 months) and having the telecommunications device poll for updates once every day would result in a lot of unnecessary network traffic. However, the lower the poll frequency, the longer it can take to update the telecommunications devices. Even if the telecommunications devices poll once every three days and updates occur twice per year, then most of the polls (98.5%) may not be necessary. Further, for the average telecommunications device, the number of firmware updates diminishes over time (e.g., there may be more updates in the first year that a telecommunications device is brought into the market than in the second year). This means that during the lifecycle of a telecommunications device, the telecommunications device may need updates less frequently. In some telecommunications networks, FOTA polls can contribute around 10 TB of network traffic, and approximately 9.9 TB may be associated with unnecessary network traffic.
- Pull: A user initiates download of firmware updates. However, pulling may require the user to be technically savvy and may require the user to be diligent. Typically, some firmware updates are critical/necessary for network security/stability and it may be highly desirable for all telecommunications devices to have the current version of firmware. Such cannot be assured with a pull system that relies on the user to initiate downloads.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

DETAILED DESCRIPTION

This disclosure is directed to providing firmware updates to telecommunications devices while alleviating network congestion. In some embodiments, a telecommunications device may be configured to selectively poll a cellular telecommunications network. The telecommunications device may be configured such that polling of the cellular telecommunications device may be activated and deactivated. In some instances, the telecommunications device may be configured to poll in response to receiving a notification that a firmware update is available. The telecommunications device may be configured to deactivate polling upon successful downloading of the firmware update. By doing so, the telecommunications device does not congest the cellular telecommunications device with unnecessary polls when no new firmware update is available. In addition, the cellular telecommunications network does not need to identify which telecommunications devices failed to successfully download the firmware update and need not reschedule those telecommunications devices for another download attempt, thereby reducing overhead of the cellular telecommunications network.

Example Network Architecture

Figure 1:
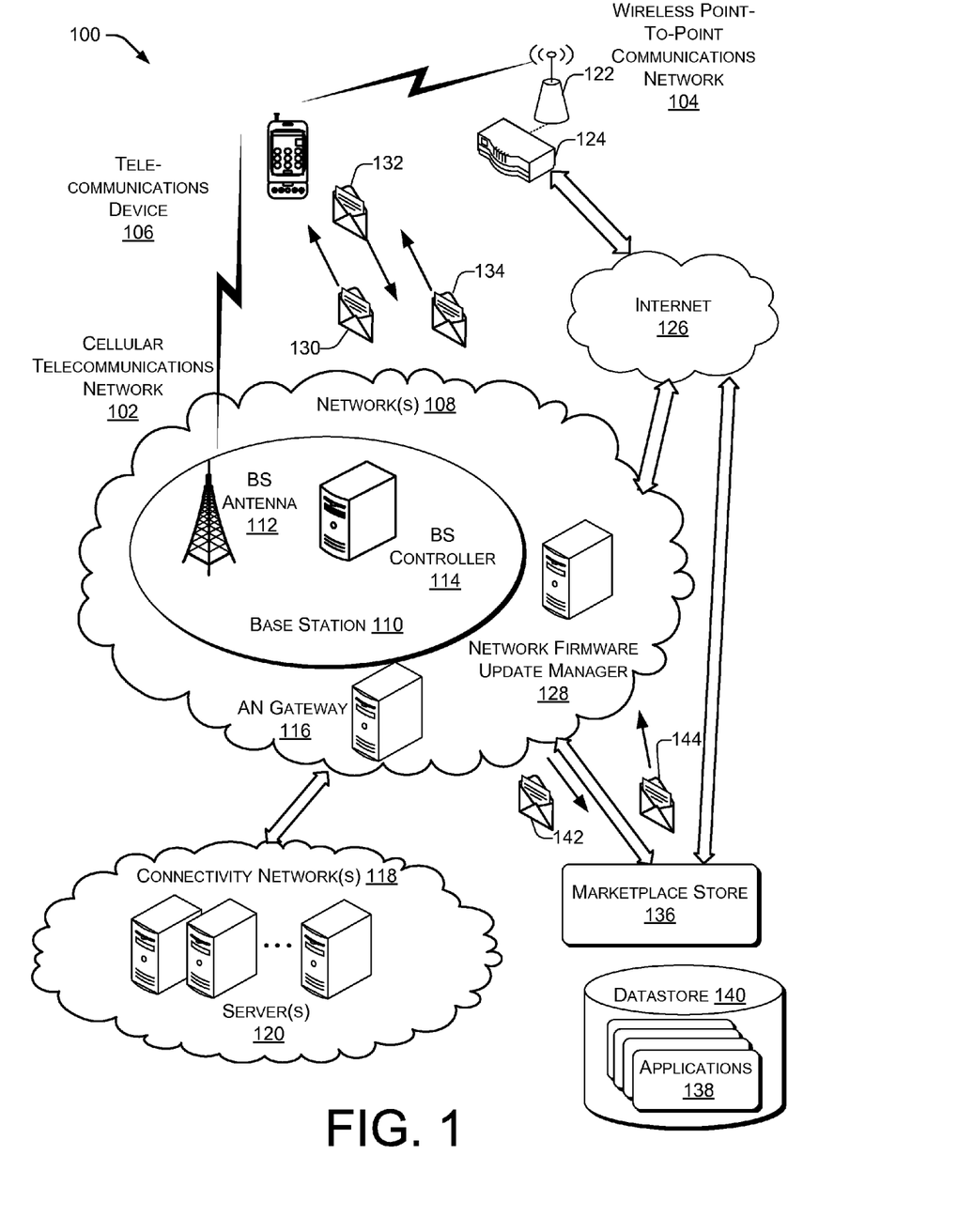
FIG. 1 illustrates an example network architecture that includes a telecommunications device, a cellular telecommunications network and a wireless point-to-point communications network.

FIG. 1 illustrates an exemplary architecture 100 for implementing firmware updates, over a cellular telecommunications network 102 and/or over a wireless point-to-point communications network 104, provided to a telecommunications device 106.

The cellular telecommunications network 102 may include an access network 108, which is representative of any one or combination of multiple different types of networks, interconnected with each other and functioning as a single large network (e.g., circuit-switched telephone networks or IP-based packet-switch networks). The access network 108 may also include wire-based networks (e.g., PSTN, IP-based, etc.) and wireless networks (e.g., cellular, satellite, IP-based, etc.).

The access network 108 may use any number of protocols and configurations to enable the telecommunications device 106 to access other devices and resources. The access network 108 may include several types of circuit-switched telephone networks, such as Public Switched Telephone Network (PSTN) and packet-switched networks, such as the Internet. For example, the network 106 may include a Global System for Mobile Communication (GSM) network, a Code Division Multiple Access (CDMA) network, an Enhanced Data Rates for GSM Evolution (EDGE) network, a Universal Telecommunications System (UMTS) network and/or other types of circuit-switched networks, a Long Term Evolution (LTE) network, a Worldwide Interoperability for Microwave Access (WiMAX) network, the Internet, and/or other packet-switched networks. The access network 108 may also include private networks such as a mobile telephone operator's networks which may use proprietary systems or protocols that are different from the systems or protocols implemented on public networks.

In the case of wireless networks, the access network 108 may include one or more base stations, NodeBs, and eNodeBs 110 (referred to herein as "base stations 110"). Each base station 110 may include a base station antenna 112 and a base station controller or radio network controller 114 (referred to herein as "base station controller 114"). In networks 106 offering LTE connections, the base station controller 114 functionality may be distributed between an eNodeB 108 and a mobility management entity or serving gateway of a core network. Thus, while the base station controller 114 is discussed throughout as being part of a base station 110, it is to be understood that part of the base station controller 114 may be distributed between a base station 110 of an access network 108 and a core network connected to the access network 108. The base station controller 114 may, among other things, schedule network resource allocations. The base station antenna 112 may transmit/receive wireless signals to/from the telecommunications device 106. The access network 108 may provide, among other things, wireless connectivity with the telecommunications device 106.

The access network 108 may also include one or more access network gateways (AN-Gateways) 116. The AN-Gateway 116 may, among other things, provide and establish connectivity with a connectivity network 118 (also referred to as a "core network"). The connectivity network 118 may be responsible for establishing connectivity with an IP backbone and may include one or more servers 120. Severs 120 may include Dynamic Host Configuration Protocol (DHCP) servers, Domain Name System (DNS) servers, and Authentication, Authorization, and Accounting (AAA) servers.

The wireless point-to-point communications network 104 may include a transceiver 122 such as, but not limited to, a Wi-Fi or Bluetooth transceiver. The transceiver 122 may be connected to a relay router 124. The relay router 124 may be responsible for routing the Ethernet data traffic through the Internet 126 to the networks 108.

The cellular telecommunications network 102 may also include a network firmware update manager 128, which may provide firmware update notifications 130 to the telecommunications device 106. The firmware update notifications 130 may be provided to the telecommunications device 106 via the cellular communications network 102 and/or the wireless point-to-point communications network 104.

The telecommunications device 106 may send a response 132, which may be sent via the cellular communications network 102 and/or the wireless point-to-point communications network 104, to the network firmware update manager 128. The response 132 may include authentication information such as device information and a request for firmware update.

The telecommunications device 106 may download, via the cellular communications network 102 and/or the wireless point-to-point communications network 104, firmware update 134. The telecommunications device 106 may be configured to request/poll for the firmware update 134 in response to a firmware update notification 130. In some embodiments, the telecommunications device 106 only requests/polls for the firmware update 134 in response to a firmware update notifications 130, i.e., the telecommunications device 106 does not request/poll for firmware update 134 unless the telecommunications device 106 receives a firmware update notifications 130. The telecommunications device 106 may also be configured to request/poll for firmware update 134 in response to a firmware update notifications 130, and in case the download of the firmware update 134 is unsuccessful, the telecommunications device 106 may continue to poll for the firmware update 134 until the firmware update 134 has been successfully downloaded.

The environment 100 may also include a marketplace application store 136. The marketplace application store 136 may be controlled by an entity that does not control the cellular telecommunications network 102. For example, an entity controlling the cellular telecommunications network 102 may be a telecommunications service provider, and the entity controlling the marketplace application store 136 may be a provider/manufacturer of telecommunications devices and/or may be a provider of operating systems employed by telecommunications devices. The marketplace application store 136 may generally provide applications 138, which are utilized on the telecommunications device 106 and which may be downloaded from a datastore 140. When a version of an application 138 is updated, the marketplace store 136 notifies telecommunications devices that have the previous version of the application 138.

In some instances, the telecommunications device 106 may have a firmware update application, which may be preloaded in the telecommunications device 106 and/or downloaded from the marketplace application store 136. The network firmware update manager 128 may provide the marketplace application store 136 with an update notification 142, such as a new version of the firmware update application, and the marketplace application store 136 may provide an update massage 144, which corresponds to the update notification 142, to the telecommunications device 106. In some embodiments, the firmware update application, on the telecommunications device 106, may poll marketplace application store 136 for an update message 144, and in other embodiments, the marketplace application store 136 may provide an indication of the update notification 142 without receiving a poll from the telecommunications device 106. Communications between the telecommunications device 106 and the marketplace application store 136 may be via the cellular telecommunications network 102 and/or the wireless point-to-point communications network 104.

The telecommunications device 106 may be configured to download, or attempt to download, the firmware update 134 in response to receiving an update message 144. In some embodiments, the telecommunications device 106 may repeatedly attempt to download the firmware update 134 until the firmware update 134 is successfully downloaded and may cease to attempts to download the firmware update until receiving a subsequent update message 144.

Network congestion in the cellular communications network 102 is alleviated by the network firmware update manager 128. The network firmware update manager 128 may be configured to schedule when to provide firmware update notifications 130 and may schedule providing the firmware update notifications 130 at off-peak times (i.e., at times when network congestions is not above a predetermined amount). Network congestion in the cellular communications network 102 may also be alleviated/reduced by having the telecommunications device 106 configured to selectively poll the cellular communications network for firmware updates 134 such as, for example, after having received a firmware update notification 130 and/or update message 144.

Network congestion in the cellular communications network 102 may also be alleviated/reduced by offloading communications to the wireless point-to-point communications network 104. For example, rather than a firmware update notification 130 through the cellular communications network 102, the network firmware update manager 128 may trigger the marketplace application store 136 to provide the update message 144 to the telecommunications device 106 via the wireless point-to-point communications network 104. In addition, the firmware update 134 may be downloaded via the wireless point-to-point communications network 104.

In some embodiments, the telecommunications device 106 may be configured to alleviate network congestion in the cellular communications network 102. For example, the telecommunications device 106 may be configured to not poll the cellular communications network 102 based on various factors. For example, the telecommunications device 106 may determine whether the telecommunications device 102 currently belongs to the cellular communications network 102 and may be configured to not poll the cellular communications network 102 if it does not currently belong to the cellular communications network 102. As another example, the telecommunications device 106 may be configured to selectively poll the cellular communications network 102 such as, for example, only after initially joining the cellular communications network 102 and/or only after failing to successfully download the firmware update 134.

Example Network Firmware Update Manager

Figure 2:
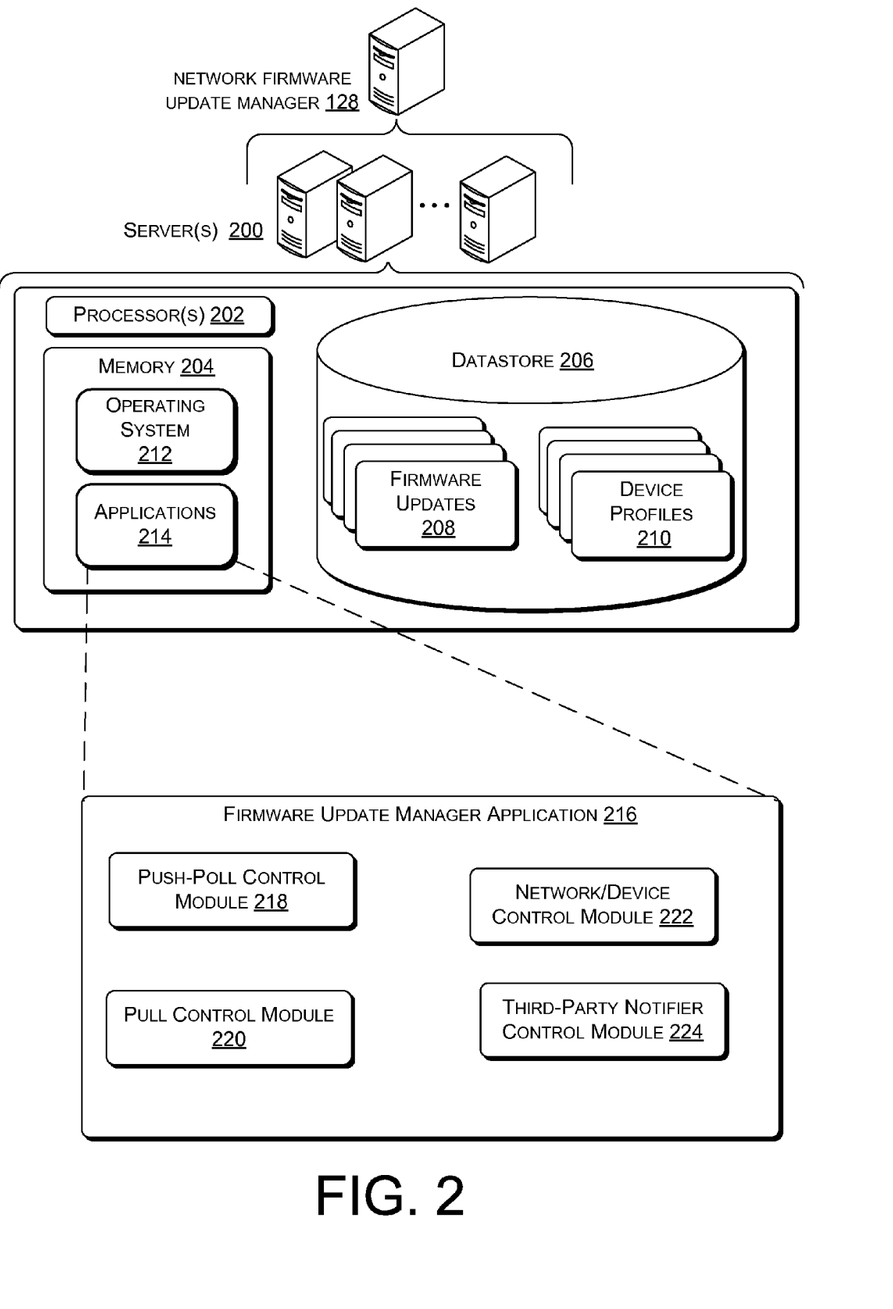
FIG. 2 is a block diagram showing various components of an illustrative network firmware update manager shown in FIG. 1.

FIG. 2 shows the network firmware update manager 128 such as might be used in conjunction with the techniques described here.

The network firmware update manager 128 may include one or more server(s) 200 that include processors(s) 202, memory 204 and datastore 206, which may store firmware updates 208 and device profiles 210. The firmware updates 208 may include firmware updates for various types of devices (e.g., different types of telecommunications devices) and historical firmware updates (e.g., current and past versions of firmware updates). Device profiles 210 may include profiles for various types of devices (e.g., different types of telecommunications devices). The network firmware update manager 128 may utilize the device profiles 210 to, among other things; provide an appropriate firmware update 208 to the telecommunications device 106—e.g., match the telecommunications device 106 to a correct firmware update 208.

The memory 204 may include volatile memory (such as RAM), nonvolatile memory, removable memory, and/or non-removable memory, implemented in any method or technology for storage of information. Also, a processor may include onboard memory in addition to or instead of the memory 206. Some examples of computer-readable storage media which may be included in the memory, and/or processor include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information.

The memory 204 may include an operating system 212, applications 214 and store various modules, programs, or other data. The operating system 212 and applications 214 and items stored in the memory 204 may include instructions that, when executed by the processor(s) 202, cause the processors to perform the operations described herein.

In some embodiments, the applications 214 may include a firmware update manager application 216. The firmware update manager application 216 may include a number of modules such as, but not limited to, push-poll control module 218, pull control module 220, network/device control module 222, and third-party notifier control module 224 that perform some or all of the various operations described herein.

The push-poll control module 218 may control activation of polls by the telecommunications device 106. In some embodiments, the telecommunications device 106 may be configured to poll the cellular telecommunications network 102 in response to a firmware update notification 130, and the telecommunications device 106 may be configured, in some embodiments, to not poll the cellular telecommunications network 102 until the cellular telecommunications network 102 until after receiving a firmware update notification 130. The push-poll control module 218 may schedule when update notifications 130 are provided.

The pull control module 220 may control activations and deactivations of pulls by the telecommunications device 106. In some embodiments, the pull control module 202 may trigger a blockage of pulls by the telecommunications device 106 and may remove a blockage of pulls by the telecommunications device 106. The pull control module 220 may prevent pulls by the telecommunications device 106 based on a number of factors including whether there a current firmware update 208 for the telecommunications device 106 exists.

The network/device control module 222 may control activations and deactivations of pulls and/or polls by the telecommunications device 106. In some embodiments, the network/device control module 222 may trigger a blockage of pulls and/or polls by the telecommunications device 106 and may remove a blockage of pulls and/or polls by the telecommunications device 106. The network/device control module 222 may prevent pulls and/or polls by the telecommunications device 106 based on a number of factors including whether the telecommunications device 106 currently belongs to the cellular telecommunications network 102. For example, the telecommunications device 106 may have at one time in the past belonged to cellular telecommunications network 102 (e.g., it was on a service plan offered by the cellular telecommunications network 102), but the telecommunications device 106 may now belong to a different cellular telecommunications network. In that case, the network/device control module 222 may block the telecommunications device 106 from pulling/polling the cellular telecommunications network 102.

The third-party notifier control module 224 may control and generate update notifications 142 to the marketplace application store 136. The third-party notifier control module 224 may generate update notifications 142 when new firmware updates 208 are available and may include an indicator of device type and/or an indicator of version information.

Telecommunications Device

Figure 3:
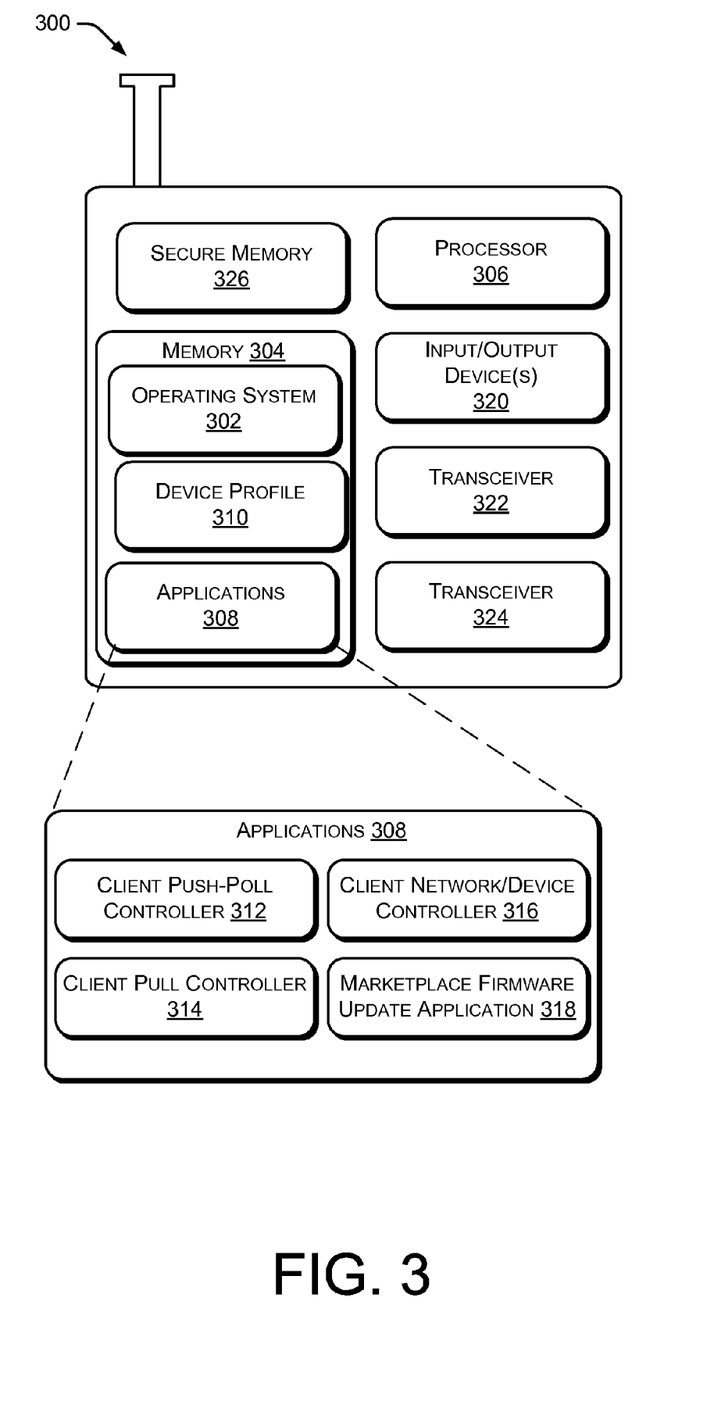
FIG. 3 is a block diagram showing various components of an illustrative telecommunications device.

FIG. 3 shows a telecommunications device 300 such as might be used in conjunction with the techniques described here. In many cases, telecommunications device 300 will be what is commonly referred to as a "cell phone," although the described techniques can be used in conjunction with any telecommunications device.

The telecommunications device 300 typically has an operating system 302 executed from some form of solid-state memory 304 by one or more processors 306.

Applications 308 and device profile 310 may also be stored in memory 304. Device profile 310 may include, among other things, information pertaining to device type (e.g., brand and/or model) and operating features/characteristics (e.g., operating system (and version number), network information such as, but not limited to, mobile country code (MCC) and mobile network code (NMC)).

Applications 308 may include custom software, which may be preloaded onto the device to perform various functions and to support the different communication modes and third-party software. The applications 308 may include a client push-poll controller 312, a client pull controller 314, a client network/device controller 316 and a marketplace firmware update application 318. Other non-limiting examples of applications 308 include e-mail, instant messaging, address book, day organizer, etc.

The user interfaces of telecommunications devices vary widely. The user interfaces include input/output devices 320. The most basic input/output devices 320 might include a numeric telephone-type keypad, to which has been added "talk" and "end" buttons for controlling voice calls, and a basic output device consisting of a single-line display for indicating telephone numbers. Other input/output devices 320 might include touch-screen interfaces, alpha-numeric keypads, a microphone, and other forms of input devices. Input/output devices 320 may also include display screens, speakers, and other forms of output devices.

The telecommunications device 300 also includes one or more transceivers 322-324. Transceiver 322 may provide a radio interface employed by a cellular communications network for voice and data communications. Transceiver 324 may provide a wireless point-to-point communications interface such as Wireless Fidelity (Wi-Fi) (IEEE 802.11) or Bluetooth (IEEE 802). Although telecommunications device 300 is illustrated having two transceivers there may be more or fewer transceivers in alternative embodiments. For example, the telecommunications device 300 may include one or more multi-mode transceivers having the functionality of at least two of the transceivers 322-324.

The telecommunications device 300 may also include secure memory 326, which may be a subscriber identity module (SIM) card. The secure memory 326 may store information such as a current MMM and/or MNC for the telecommunications device 300.

The client push-poll controller 312 may control polling by the telecommunications device 106. In some instances, the client push-poll controller 312 may prevent the telecommunications device 106 from polling the cellular telecommunications network 102 for firmware updates 134. In some instances, the client push-poll controller 312 may prevent and/or allow polling of the cellular telecommunications network 102 for firmware updates 134 based at least in part on whether the telecommunications device 106 has received a firmware update notification 130 and/or whether an immediately previous download of a firmware update 134 is successful.

The client pull control module 314 may implement activations and deactivations of pulls by the telecommunications device 106. In some embodiments, the client pull control module 314 may determine whether to activate and/or deactivate pulls based at least in part on whether an immediately previous download of a firmware update 134 is successful. For example, if an immediately previous download of a firmware update 134 was unsuccessful, the client pull control module 314 may allow pulls and may prevent/disable pulls if the immediately previous download of the firmware update 134 was successful. In some embodiments, the client pull control module 314 may prevent/disable and/or allow pulls in response to messages from the pull control module 220.

The client network/device control module 316 may implement activations and deactivations of pulls and/or polls by the telecommunications device 106. In some embodiments, the client network/device control module 316 may block pulls and/or polls =by the telecommunications device 106 and may remove a blockage pulls and/or polls by the telecommunications device 106 based at least in part on messages from the network/device control module 222. In other embodiments, the client network/device control module 316 may determine whether to prevent pulls and/or allow polls by the telecommunications device 106, independent of messages from the network/device control module 222, based on a number of factors. The factors may include determining whether the telecommunications device 300 currently belongs to the cellular telecommunications network 102. For example, the telecommunications device 300 may have at one time in the past belonged to cellular telecommunications network 102 (e.g., it was on a service plan offered by the cellular telecommunications network 102), but the telecommunications device 300 may now belong to a different cellular telecommunications network. In that case, the client network/device control module 316 may block the telecommunications device 300 from pulling/polling the cellular telecommunications network 102. The client network/device control module 316 compare network information such as, but not limited to, MCC and/or MNC retrieved from the secure memory with network information such as, but not limited to, MCC and/or MNC retrieved from the memory 304. The client network/device control module 316 may determine based at least in part on the comparison of the network information that the telecommunications device 300 does not currently belong to the cellular telecommunications network 102 and prevent pulling/polling of the cellular communications network 102.

The marketplace firmware update application 318 may have been preloaded into the telecommunications device 300 or downloaded from the marketplace store 136. The marketplace firmware update application 318 may communicate with the marketplace store 136 via the cellular communications network 102 and/or the wireless point-to-point communications network 104. The marketplace firmware update application 318 may initiate a download of firmware update 134 based at least in part on receiving an update message 144. In some embodiments, the marketplace firmware update application 318 may communicate with the marketplace store 136 via the wireless point-to-point communications network 104 only so as to alleviate network congestion on the cellular communications network 102. In some embodiments, the marketplace firmware update application 318 may query the marketplace application store for update messages 144. In other embodiments, the marketplace firmware update application 318 may wait for an update message 144.

Example Processes

Figure 4:
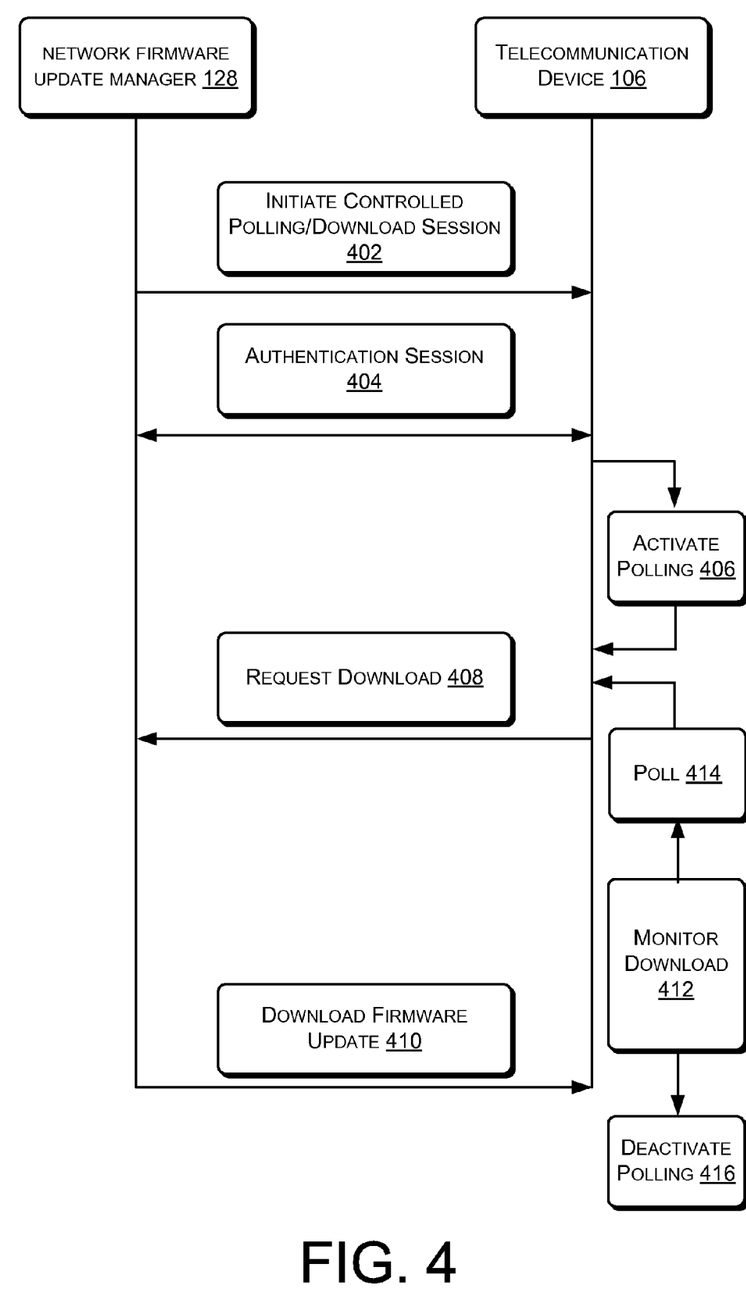
FIG. 4 is a communications flow diagram for alleviating network congestion.

FIG. 4 shows a communications flow diagram 400 for alleviating network congestion. For discussion purposes, the process 400 is described with reference to the architecture 100 of FIG. 1.

At 402, the network firmware update manager 128 initiates a controlled polling/download session. In some instances, the controlled polling/download session may be initiated by the network firmware update manager 128 providing a firmware update notification 130 to the telecommunications device 106. In other instances, the controlled polling/download session may be initiated by the network firmware update manager 128 providing an update notification 142 to the marketplace application store 136, which may then provide the update message 144 to the telecommunications device 106.

At 404, the telecommunications device 106 is authenticated. The telecommunications device 106 may include device profile information in the response 132 for authentication. The network firmware update manager 128 may authenticate the telecommunications device 106 based at least in part on information carried in the response 132. During the authentication, the network firmware update manager 128 may provide the telecommunications device 106 with update information. The update information may identify a current firmware update 134 that the telecommunications device 106 should download. In some embodiments, the marketplace application store 136 may provide the telecommunications device 106 with update information.

At 406, the telecommunications device 106 activates polling. Prior to activating polling, the telecommunications device 106 may have been configured such that polling of the cellular telecommunications network 102 was prevented/blocked.

At 406, the telecommunications device 106 request download of the identified firmware update 134. In some instance, the telecommunications device 106 may request multiple firmware updates 134. For example, the telecommunications device 106 may currently be running firmware version X and the identified firmware update may be for firmware version X+n. In that case, the telecommunications device 106 may need to download some, or all, of the intervening versions of the firmware.

At 410, download of the requested firmware update(s) 134 is initiated.

At 412, the download of the requested firmware update(s) 134 may be monitored by the telecommunications device 106. The telecommunications device 106 may determine whether the requested firmware update(s) 134 were successfully download by, for example, performing a check-sum. If the download of the requested firmware update(s) 134 is not successful, the telecommunications device 106 may poll the cellular telecommunications network 102 for the requested firmware update(s) 134 at 414. In some instances, the telecommunications device 106 may poll the cellular telecommunications network 102 for portions the requested firmware update(s) 134 that were not successfully downloaded.

On the other hand, if the download of the requested firmware update(s) 134 is successful, the telecommunications device 106 may deactivate polling of the cellular telecommunications network 102 at 416.

Example User Interface

Figure 5:
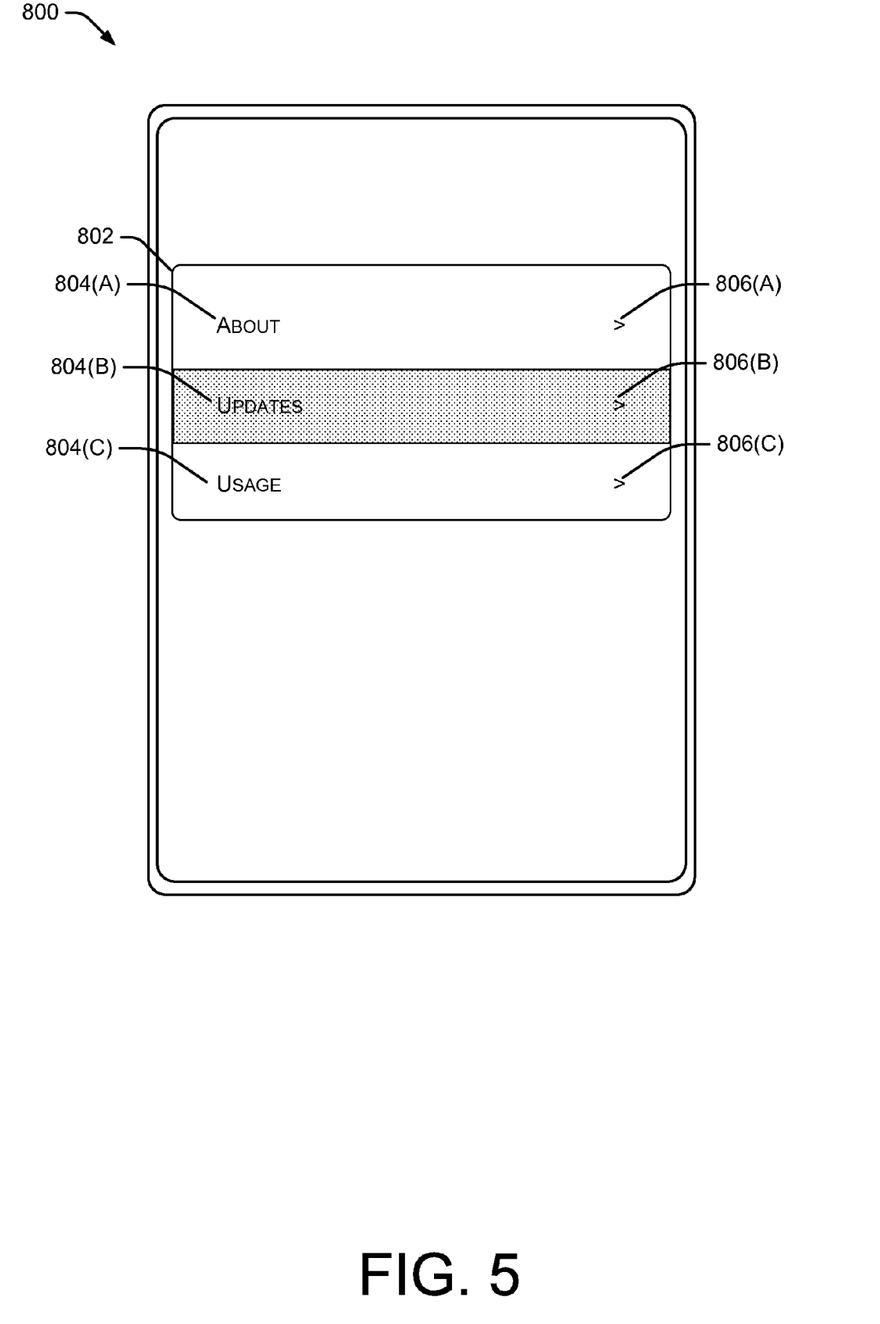
FIG. 5 is a block diagram of a user interface.

FIG. 8 shows an example user interface 800 that may be provided by the input/output devices 316 of the telecommunications device 300.

In some embodiments, the user interface 800 may be provided to a user when user initiate and/or automatic polling of the cellular telecommunications network 102 has been deactivated.

The user interface 800 may include an output window 802 that displays information/instructions to the user. The input/output window 802 may provide a menu of items 804(A)-804(C) from which the user may select and corresponding input icons/buttons 806(A)-806(C). The menu items may include UPDATES 804(b). As illustrated in FIG. 8, UPDATES 804(b) is grayed out and is unresponsive to a user's selection. This prevents a user from pulling for firmware updates and also informs the user that no updates are currently available. The telecommunications device 106 grays out UPDATES 804(b) when polling is deactivated and returns UPDATES 804(b) to not grayed out when there are firmware updates available. In some embodiments, UPDATES 804(b) is not grayed after an attempt to download firmware application 134 is unsuccessful and is grayed out at other times.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

The invention claimed is:

1. A method of providing telecommunications services, the method comprising:
   activating firmware update polling of one or more devices of a cellular telecommunications network by a telecommunications device;
   downloading a firmware update;
   determining whether the firmware update was successfully downloaded;
   responsive to determining that the firmware update download was successful, deactivating firmware update polling of the one or more devices of the cellular telecommunications network, and responsive to determining that the firmware update download was unsuccessful, polling of the one or more devices of the cellular telecommunications network for the firmware update; and
   determining whether to allow or prevent polling and/or pulling of the one or more devices of the cellular telecommunications network based at least in part on network information, wherein the determining whether to allow or prevent polling and/or pulling comprises comparing current network information with stored network information, wherein the stored network information includes at least one of mobile country code and mobile network code.

2. The method of claim 1, wherein the activating firmware update polling of the one or more devices of the cellular telecommunications network by the telecommunications device comprises:
   receiving a firmware update notification from the one or more devices of the cellular telecommunications network.

3. The method of claim 1, wherein the activating firmware update polling of the one or more devices of the cellular telecommunications network by the telecommunications device comprises:
   receiving a update message from an entity that is not the cellular telecommunications network.

4. The method of claim 3, wherein the entity is a market place store.

5. The method of claim 1, further comprising:
disabling firmware update pulls of the one or more devices of the cellular telecommunications network by the telecommunications device.

6. The method of claim 5, wherein firmware update pulls are disabled while firmware update polling is disabled.

7. The method of claim 1, further comprising:
enabling firmware update pulls of the one or more devices of the cellular telecommunications network by the telecommunications device.

8. The method of claim 7, wherein firmware update pulls are disabled while firmware update polling is disabled.

9. A method implemented on a telecommunications device by a processor configured to execute instructions that, when executed by the processor, direct the telecommunications device to perform acts comprising:
activating firmware update polling of one or more devices of a cellular telecommunications network by a telecommunications device in response to receiving a message;
downloading a firmware update;
determining whether the firmware update was successfully downloaded;
responsive to determining that the firmware update download was successful, deactivating firmware update polling of the one or more devices of the cellular telecommunications network, and responsive to determining that the firmware update download was unsuccessful, polling of the one or more devices of the cellular telecommunications network for the firmware update; and
determining whether to allow or prevent polling and/or pulling of the one or more devices of the cellular telecommunications network based at least in part on network information, wherein the determining whether to allow or prevent polling and/or pulling comprises comparing current network information with stored network information, wherein the stored network information includes at least one of mobile country code and mobile network code.

10. The method of claim 9, further comprising:
disabling firmware update pulls of the one or more devices of the cellular telecommunications network by the telecommunications device.

11. The method of claim 10, wherein firmware update pulls are disabled while firmware update polling is disabled.

12. The method of claim 9, further comprising:
enabling firmware update pulls of the one or more devices of the cellular telecommunications network by the telecommunications device.

13. The method of claim 12, wherein firmware update pulls are disabled while firmware update polling is disabled.

14. One or more non-transitory computer-readable storage media having computer-executable instructions thereon which, when executed by a computing device, implement a method of providing telecommunications services, the method comprising:
activating firmware update polling of one or more devices of a cellular telecommunications network by a telecommunications device in response to receiving a message;
downloading a firmware update;
determining whether the firmware update was successfully downloaded;
responsive to determining that the firmware update download was successful, deactivating firmware update polling of the one or more devices of the cellular telecommunications network, and responsive to determining that the firmware update download was unsuccessful, polling of the one or more devices of the cellular telecommunications network for the firmware update; and
determining whether to allow or prevent polling and/or pulling of the one or more devices of the cellular telecommunications network based at least in part on network information, wherein the determining whether to allow or prevent polling and/or pulling comprises comparing current network information with stored network information, wherein the stored network information includes at least one of mobile country code and mobile network code.

15. The one or more non-transitory computer-readable storage media of claim 14, the method further comprising:
disabling firmware update pulls of the one or more devices of the cellular telecommunications network by the telecommunications device.

16. The one or more non-transitory computer-readable storage media of claim 14, the method further comprising:
enabling firmware update pulls of the one or more devices of the cellular telecommunications network by the telecommunications device.

17. The one or more non-transitory computer-readable storage media of claim 14, the method further comprising:
polling a third-party market place store for firmware update information.

18. The one or more non-transitory computer-readable storage media of claim 14, wherein the downloading a firmware update comprises:
downloading the firmware update of a wireless point-to-point communications network.

* * * * *